United States Patent [19]

Trenary

[11] 4,064,896
[45] Dec. 27, 1977

[54] VACUUM BREAKERS

[75] Inventor: John Trenary, Fort Collins, Colo.

[73] Assignee: Teledyne Industries, Inc., Fort Collins, Colo.

[21] Appl. No.: 650,118

[22] Filed: Jan. 19, 1976

[51] Int. Cl.² ............................................. F16K 15/04
[52] U.S. Cl. ................................................... 137/218
[58] Field of Search ................................ 137/218, 217

[56] References Cited

U.S. PATENT DOCUMENTS

| 2,174,742 | 10/1939 | Groeniger | 137/218 |
| 2,608,412 | 8/1952 | Bletcher et al. | 137/218 X |
| 2,664,261 | 12/1953 | Stephany | 137/218 X |
| 3,083,723 | 4/1963 | Duchin | 137/218 |
| 3,155,107 | 11/1964 | Woodford | 137/218 |
| 3,171,423 | 3/1965 | Dillon | 137/218 |
| 3,171,424 | 3/1965 | Shames et al. | 137/218 |
| 3,183,924 | 5/1965 | Duchin | 137/218 |
| 3,805,828 | 4/1974 | Panagrossi | 251/368 X |
| 3,951,164 | 4/1976 | Crist | 137/218 |

FOREIGN PATENT DOCUMENTS 1,414,623  11/1975  United Kingdom ................. 137/218

Primary Examiner—Alan Cohan
Assistant Examiner—Gerald A. Michalsky
Attorney, Agent, or Firm—Hugh H. Drake

[57] ABSTRACT

A vacuum breaker, capable of preventing undesired reverse flow of water, includes a hermetically-sealable housing provided with inlet and outlet couplings at its respectively opposite ends. The housing defines a chamber within which is a first valve seat near the inlet coupling and a first valving member disposed in the path of flow between the couplings and cooperative with the first valve seat to block flow from outlet toward inlet. A second valve seat is disposed adjacent to the outlet opening and provides communication between the chamber and the housing exterior. A second valving member is in a position exclusive of the flow path between the inlet and outlet couplings through the first valve seat and serves to selectively block communication between the chamber and the exterior.

2 Claims, 7 Drawing Figures

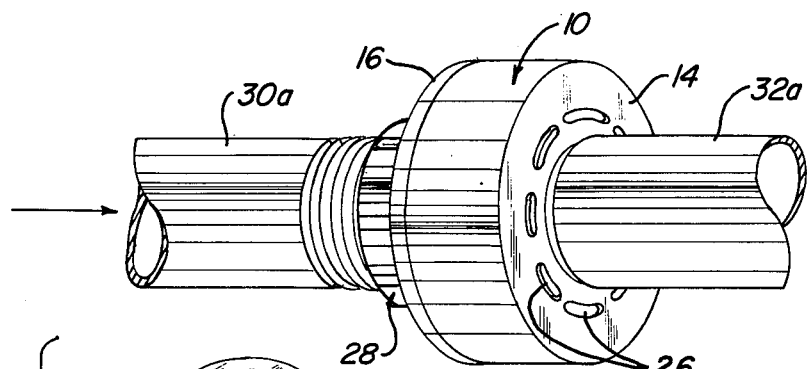
Fig _ 1
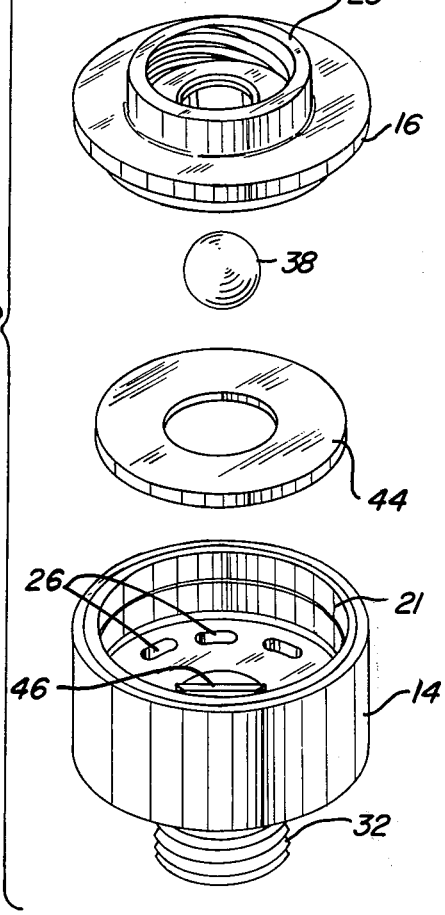
Fig _ 2
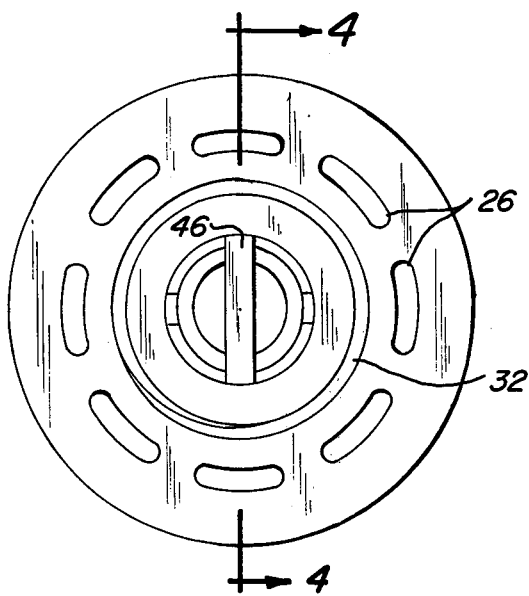
Fig _ 3

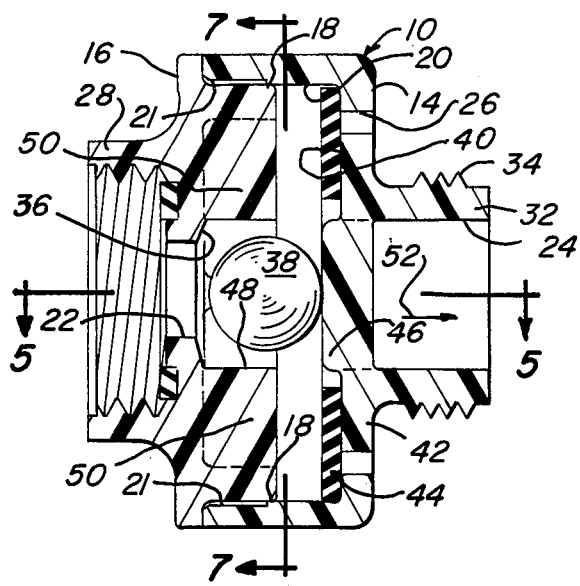
Fig_4
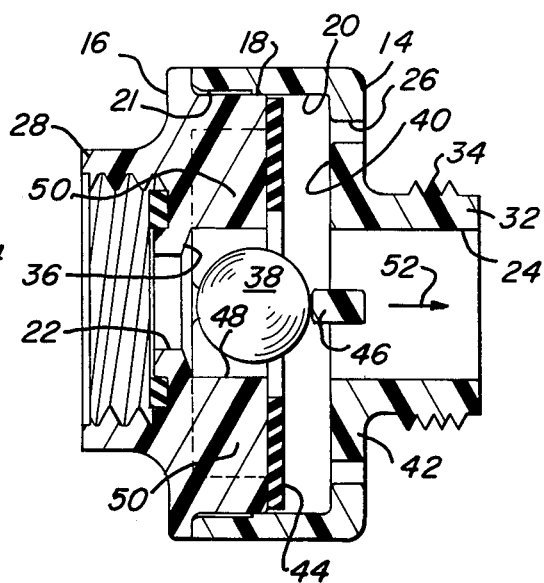
Fig_5
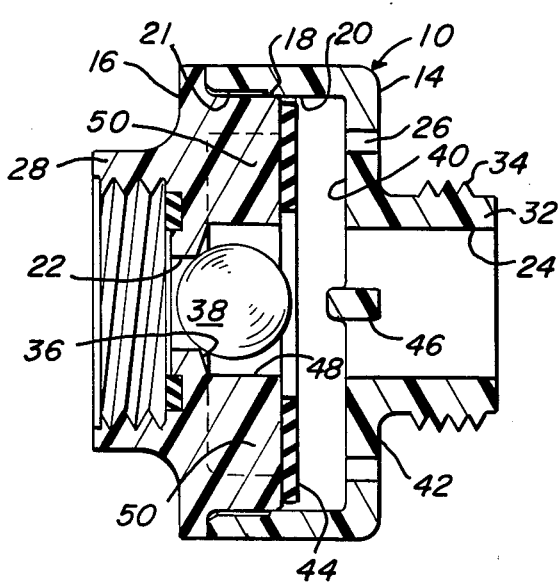
Fig_6
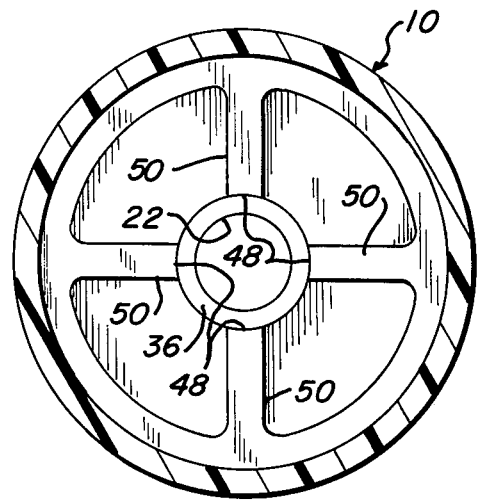
Fig_7

VACUUM BREAKERS

The present invention pertains to vacuum breakers. More particularly, it relates to a device for insertion in such as domestic water supply lines for insuring that water not be drawn into the supply system from an outlet.

Whether it be from an individual source serving a single usage or a utility system feeding a large number of taps, it is desirable to guard against any condition by means of which contaminated water might be sucked inwardly toward a water supply from what is intended to be an outlet from that supply. In a utility system for supplying water to a number of buildings for domestic purposes, for example, proper operation assumes the existence of a given water pressure within the distributing pipes so that all water must flow, if at all, toward and out of user-controlled outlets. The possibility exists that a rupture in the distribution system could result in water being siphoned or fed by gravity back from an open outlet into the distribution system.

A similar possibility of unwanted backflow from an outlet may present itself in other types of fluid distribution systems. In any case, it is known to prevent such backflow by including some type of check valve in each outlet line. The valve is biased so as to permit the flow of the fluid in only the direction toward the outlet. One particular approach involves the use of what has become known as a vacuum breaker. This kind of device not only checks against the flow of the fluid in the reverse direction but also, upon so checking, operates to free the outlet lines of any vacuum condition which attempted to start the backflow. This breaking of the vacuum in the lines permits any fluid, such as water, in the outlet lines to drain on outwardly.

Such vacuum breakers have been employed in a variety of environments. They often are required in connection with lawn sprinkling systems, so as to prevent water residing in such a system from somehow being drawn back into the distribution system. They also have been prescribed for use in connection with supplies to swimming pools and other implementations that, in some cases, could serve as a large body of possibly undesirable water that might, in case of faulty operation of the distribution system, be drawn back into that system. Concern has been expressed that, given an accident to the distribution system, water might be withdrawn from a shower spray of the type having a flexible hose between the spray head and a faucet or the like so that the spray head might be left in a condition in which it was immersed in a bathtub containing water.

It is, of course, well known to employ a check valve, such as a ball and seat, in conduits for the purpose of permitting fluid flow in only one direction. It is also known to include a second valving mechanism for the purpose of permitting the breathing of air into the valve housing so as to "break" the vacuum condition. So far as has been determined, such vacuum breakers, as they often are called, are comparatively costly and, at least often, rather cumbersome in terms of space required and installation procedures.

It is, accordingly, a general object of the present invention to provide a new and improved vacuum breaker which is superior in one way or another to those discussed above.

A further object of the present invention is to provide a new and improved vacuum breaker which is exceedingly simple to manufacture and assemble with resulting cost reduction.

Another object of the present invention is to provide a new and improved vacuum breaker that is quite compact and yet which is fully suitable for use in a domestic environment.

A vacuum breaker constructed in accordance with the present invention includes a hermetically-sealable housing having an outlet coupling at one end and an inlet coupling at the other, the housing defining therein a chamber. A first valve seat is located at the end of the chamber in the vicinity of the inlet coupling. A first valving member is disposed in the path of flow between the couplings and cooperates with the first valve seat to block backflow along such path. A second valve seat is located adjacent to the outlet coupling and includes means for communicating therethrough between the chamber and the exterior of the housing. Finally, a second valving member, also disposed within the housing, is in a position exclusive of the flow path between the inlet and the outlet through the first valve seat and cooperates with the second valve seat so as to block such communication.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an isometric view of a vacuum breaker coupled into a supply line;

FIG. 2 is an exploded isometric view of the breaker shown in FIG. 1;

FIG. 3 is a right-end-elevational view of the breaker shown in FIG. 1;

FIG. 4 is a cross-sectional view taken along the line 4—4 in FIG. 3;

FIG. 5 is a cross-sectional view taken along the line 5—5 in FIG. 4 and with one of the parts in a different position;

FIG. 6 is a cross-sectional view like that of FIG. 5 but with another of the parts in a different position; and FIG. 7 is a cross-sectional view taken along the line 7—7 in FIG. 4 but with one of the parts removed.

A vacuum breaker 10 includes a housing 12 formed from a mating pair of half shells 14 and 16 sonically welded together as at 18 so as to define a chamber 20. An inner recess 21, extending from the lip of shell 14, accommodates a tight external fit of the shells and concentrates the sonic sealing area 18. Except for space-opposed inlet and outlet openings 22 and 24, and a plurality of vents 26, the housing is hermetically sealed.

Projecting outwardly from shell 16 is an inlet coupling 28 internally threaded as at 30 with a standard pipe thread so as to receive a supply pipe 30a. Inlet opening 22 is in the bottom of coupling 28. A resilient washer 31 is seated in the bottom of inlet coupling 28. Similarly, outlet opening 24 is defined within an outlet coupling 32 externally threaded as at 34 again with a standard pipe thread to accept an outlet pipe 32a. Inlet opening 22 leads to a first valve seat 36 that cooperates with a valving member 38 in the form of a ball of resilient material, such as rubber or plastic, engagable sealingly with seat 36.

The inner surface 40 is of a radially-projecting shoulder 42 formed in shell 14 serves as a second valve seat in association with each of vent openings 26. A valving member 44 is in the form of an annular washer of resilient material, such as rubber, and seats against that second valve seat 40 so as sealingly to close vent openings 26. Washer 44 is free floating within chamber 20, being generally guided and located around the axis, defined between the inlet and outlet couplings, by a bar 46 integrally formed with shell 14 and extending transversely across the interior side of outlet opening 24. Ball valving member 38 is captivated by bar 46 within a channel 48 defined by the inner ends of a plurality of radially-extending ribs 50 that project inwardly from the laterally located wall of shell 16. In FIG. 7 which shows the symmetrical distribution of ribs 50, ball valving member 38 has been removed.

In practical use, vaccuum breaker 10 is coupled into a water supply line so that water normally flows along the path indicated by arrow 52. Vent openings 26 communicate from chamber 20 to the atmospheric pressure existent on the exterior of housing 12. The pressure of the normally flowing water causes valving member 38 to rest in the open condition against bar 46, while the pressure within chamber 20 also serves to sealingly seat washer 44 in covering relation to vent openings 26 (FIG. 4). Upon the occurrence of a reduction of water pressure within chamber 20 below atmospheric, however, washer 44, being freely floatable within chamber 20, moves away from its covering relationship of vent openings 26 (FIG. 5) as a result of which atmospheric air from the exterior of housing 12 is permitted to enter chamber 20. This enables any water, sucked up the conduit connected to outlet coupling 32, to discharge on outwardly either by gravity or siphon effect as the case may be. Should the low pressure or vacuum condition within chamber 20 persist and become greater, valving ball 38 thereafter is pushed toward and into sealing engagement with valve seat 36 (FIG. 6), thereby creating a most positive block against the reverse flow out of inlet 22 and into the connecting distribution system. It will be observed that atmospheric air admitted through vent openings 26 assists in the closure action of valving ball 38.

The completed assembly involves but three separate parts, the unitary housing, ball valving member 38 and flap valving member 44. During assembly, the latter two components are simply rested in place after which the two initial half shells 14 and 16 are permanently joined together. For use with standard houshold plumbing, as commonly employed in residential and commercial buildings, housing 10 need only have a diameter of the order of one and one-half inches and a length, exclusive of the threaded portions of the coupling, of but about one-half inch. Despite the obvious economy of materials and assembly costs, the breaker is entirely suitable to insure positively against unwanted reverse flow in the case of low pressure development in the incoming supply lines.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A vacuum breaker comprising:

a first tubular housing portion having an outwardly facing inlet coupling that opens into an interior bore in which is defined an inwardly-facing first valve seat;

a second tubular housing portion having an outlet coupling facing outwardly and opposite said inlet coupling, said first and second portions being joined together to define a fluid flow path between said inlet and outlet couplings and an interior chamber surrounding said fluid flow path with an interior wall of said chamber defining a second valve seat facing inwardly and toward said first valve seat;

means defining at least one opening from said chamber through said second valve seat to the exterior of said second portion;

a first valve member free-floatingly disposed in said bore and sealingly engageable with said first valve seat upon the flow of fluid toward said inlet coupling from either of said outlet coupling and said opening;

and a second valve member free-floatingly disposed in said chamber in a position exclusive of said fluid flow path and sealingly engageable with said second valve seat in response to the flow of fluid from said inlet coupling to said outlet coupling.

2. A breaker as defined in claim 1 in which said second portion includes an integral interior member disposed in said fluid flow path in a position limiting opening movement of said first valve member to an amount that retains said first valve member captivated primarily within said bore.

* * * * *